United States Patent [19]
Lechter

[11] Patent Number: 5,101,139
[45] Date of Patent: Mar. 31, 1992

[54] REDUCING VIDEO DISPLAY RADIATION

[75] Inventor: George S. Lechter, Needham, Mass.

[73] Assignee: Safe Computing, Inc., Needham, Mass.

[21] Appl. No.: 479,360

[22] Filed: Feb. 13, 1990

Related U.S. Application Data

[63] Continuation of Ser. No. 321,011, Mar. 9, 1989, abandoned.

[51] Int. Cl.$^5$ ................................................ H01J 1/00
[52] U.S. Cl. ........................................ 315/85; 313/112
[58] Field of Search .......................... 315/85; 313/112; 350/330, 339 F, 345, 352; 358/56, 60, 225

[56] References Cited

U.S. PATENT DOCUMENTS

4,845,402  7/1989  Smith .............................. 315/85 X

Primary Examiner—Robert J. Pascal

[57] ABSTRACT

A video display has a flat panel display, and to reduce electric field radiation, includes a conducting shield having a transparent conducting surface overlying the display. The terminal is also shielded and wired to reduce magnetic field radiation.

21 Claims, 6 Drawing Sheets

REDUCING VIDEO DISPLAY RADIATION

This application is a continuing application of abandoned application Ser. No. 07/321,011 filed Mar. 9, 1989.

This invention relates to reducing radiation from video displays, such as televisions and other video display units.

Video display terminals (VDT's) are widely used to provide information display in computer systems. A typical cathode ray tube (CRT) VDT emits radiation, such as electric field radiation, x-rays, and magnetic field radiation. Flat panel displays such as gas plasma, liquid crystal display (LCD), active matrix LCD and electro-luminescent type VDT's emit substantial electric field radiation.

Electric radiated fields are believed to produce a buildup of negative ions around the display, which may cause a corresponding buildup of ions on the user. These ions may attract charged dust particles, which may lead to skin and eye irritation in sensitive individuals, and may, according to some scientists, cause psychological stress, fatigue, or behavioral changes.

Magnetic radiated fields are also created by electric currents in components such as power transformers and deflection coils. Magnetic fields, through induction, create current inside human cells, as well as cyclotron magnetic resonance effects in cell walls.

SUMMARY OF THE INVENTION

The invention comprises a video display having a flat panel display, such as a liquid crystal display, with a transparent conducting shield over the screen.

The invention also comprises shields composed of metallic transparent meshes or other conductive transparent material, the mesh lines preferably being oriented parallel to the diagonals of the display face.

The invention also comprises a lighting apparatus for illuminating the liquid crystal display, preferably from the rear, enclosed in a conductive housing for shielding electric field radiation.

The invention also comprises a lighting apparatus comprised of one or more miniature fluorescent bulbs powered by a transformer and connected to a power source by a shielded power cord.

The invention also comprises a polarizing filter for polarizing the illuminating light such that the interaction of the polarized light and the illuminated LCD display create a dimming effect, reduce ultraviolet light, and increase contrast.

The invention also comprises a polarizing filter which can be moved to adjust the dimming effect.

The invention also comprises a parabolic light redirection surface for use with the light source to focus and redistribute light on the display.

The invention also comprises a light balancer comprised of opaque sheets which evenly distributes the illuminating light on the display screen.

The invention also comprises colored cards, panels, or other devices which can be placed between the lighting apparatus and the display to allow dimming and/or changing the color of the illuminating light, where the panels or cards are shaded, colored, or polarized.

The invention also comprises an apparatus for converting video input signals into a signal that can be readily displayed by the flat panel display.

The invention also comprises a lighting apparatus having an incandescent bulb in a conductive housing that is vented to permit the passage of air. When used with an incandescent bulb, the colored cards serve as an insulation device.

The invention also comprises a metallic screen forming one of the sides of the conductive housing so as to permit the passage of light but inhibit the passage of electric fields. To shield magnetic fields, the housing is manufactured of a magnetically shielding material.

The invention also comprises two fluorescent bulbs and two ballasts used as the lighting apparatus, the ballasts oriented relative to each other in order to cancel their magnetic field radiation. Furthermore, the ballasts are located in a power strip which may be placed at a distance from the display. This power strip is preferably manufactured of a magnetically shielding material.

The invention also comprises paired wires for carrying electric power to the lighting apparatus. The wires are paired to reduce magnetic field radiation; furthermore, the wires are closely affixed to the fluorescent bulbs' surfaces to cancel the magnetic field created by the current flowing through the bulb.

The invention emits very little electric, x-ray, or magnetic radiation. The liquid crystal display is illuminated by a fluorescent backlight to provide good contrast. The backlight is filtered by a number of cards which can be used to color or dim the illuminating light.

Numerous other features and advantages of the invention will become apparent from the following specification when read in connection with the accompanying drawing in which:

Figure 1:
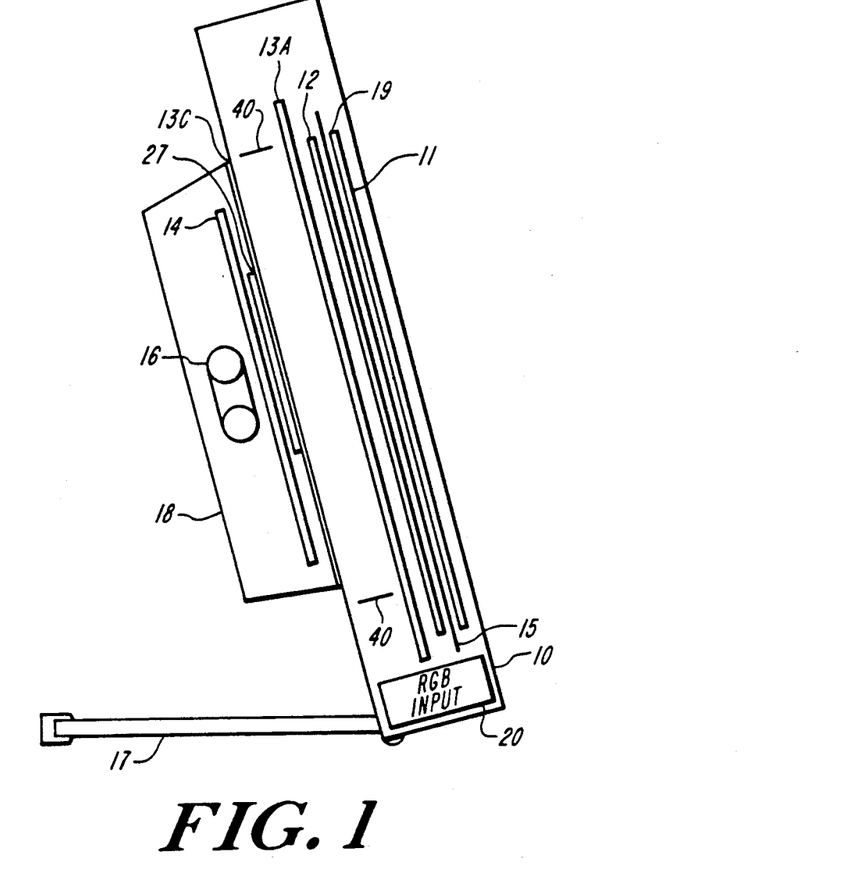
FIGS. 1 and 2 are side and panoramic front views, respectively, of a VDT according to the invention.

Referring to FIG. 1, there is illustrated a side view of a video display according to the invention. An antireflective coating is laminated on the front of display glass 11, overlaying a conductive, electrically grounded transparent shield 19. A polarized filter assembly 15, comprised of one or two polarized sheets, overlays LCD 12 and is behind transparent shield 19. Transparent shield 19 typically comprises a conducting mesh or film on a glass or plexiglass backing. A flat panel display such as an LCD 12 is backed by the thin light background/diffuser 13A. When the assembly is viewed from the front, light background/diffuser 13A is visible because the coating and display glass 11, shield 19 and LCD 12 are all transparent. Diffuser 13A is an optically opalized paper or plastic with a non-reflective surface facing LCD 12. It creates a smooth light distribution and produces no reflections.

There is typically one inch between light background/diffuser 13A and the rear light diffuser 13C.

The cavity 40 formed between the background/diffuser 13A and rear light diffuser 13C is surrounded by walls of reflective material which aid in the proper illumination of the corners of the cavity.

Behind rear light diffuser 13C is a light balancing device 27, comprising a sheet of plastic or layers of high quality paper, arranged to provide an even concentration of light in the cavity. Behind light balancing device 27 is a polarized light dimmer/color panel 14. Panel 14 comprises one or more polarized or colored plastic sheets.

Behind light dimmer/color panel 14 are fluorescent lights 16, housed inside a metallic conductive light box assembly housing 18. Fluorescent lights 16 are standard microminiature low cost light sources. Main housing 10 supports the above elements, and rests upon legs 17. Input 20 receives a video signal, such as an RGB or VGA signal.

Figure 2:
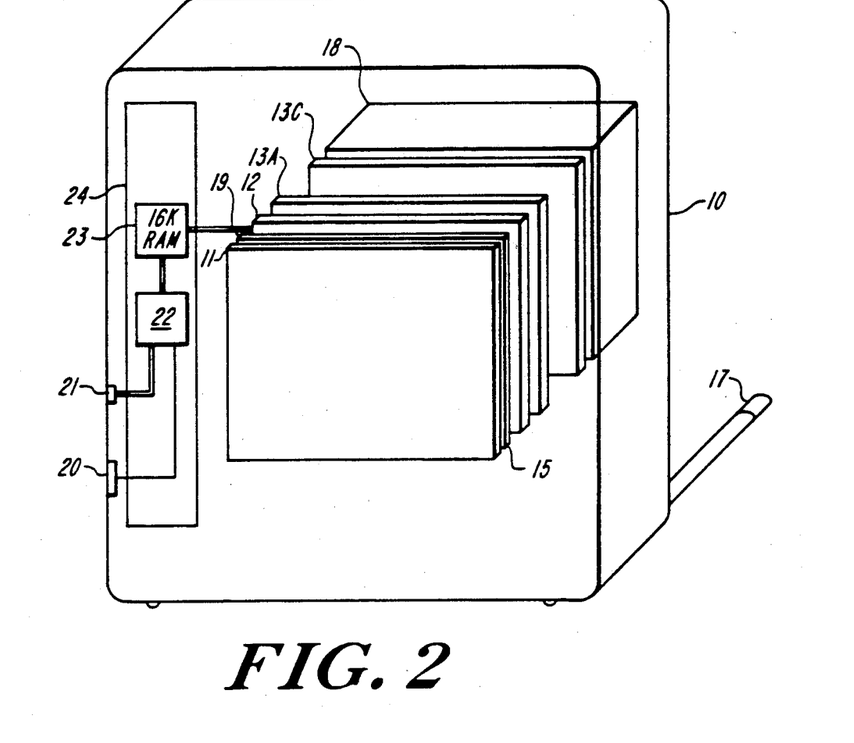

FIG. 2 shows a panoramic front view of main housing 10. The signal input 20 connects to the host computer, and a 9 volt D.C. power supply connects to power input 21. The input signal is processed by character converter 22 with the aid of memory 23 to provide a video signal displayed on LCD 12. The control circuitry, comprising converter 22 and memory 23, rests on circuit board 24.

Figure 3:
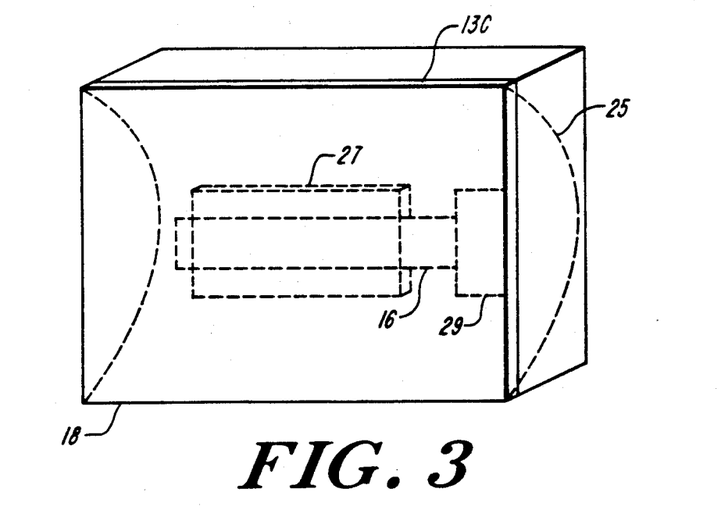
FIGS. 3 and 4 are front and side views, respectively, of a light box for illumination according to the invention.

FIG. 3 shows a front view of a light box assembly 18. One or more fluorescent bulbs 16 are powered by ballast 29. Light balancing device 27 is adjacent to rear diffuser 13C. Polarized light dimmer/color panel 14 is omitted to avoid obscuring other features. Parabolic light redirection surface 25 focuses light onto rear light diffuser 13C.

Figure 4:
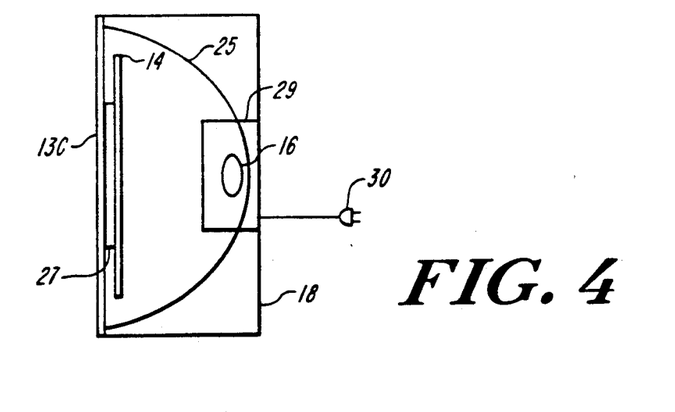

FIG. 4 is a side view of light box assembly 18 showing component parts seen in FIG. 3 along with the polarized light dimmer/color panel 14 and power cord 30. Light dimmer/color panel 14 may be removed from light box assembly 18 and inserted in one of a number of different orientations to vary the polarization of the light entering main housing unit 10. Power cord 30 carries 120 Volts A.C. to ballast 29.

Figure 5:
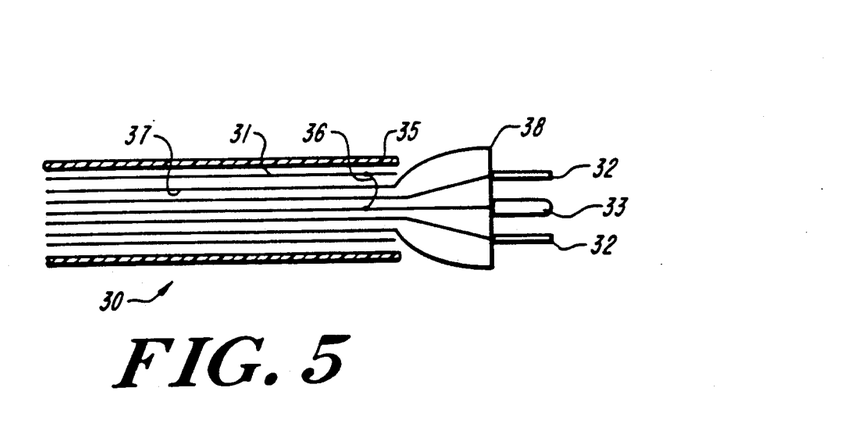
FIG. 5 is a detail view of an electric field shielded power cord according to the invention.

FIG. 5 shows a detail view of power cord 30. It is a standard power cord, surrounded by a heavy insulating cover 35 and a conductive shield 31 connected to grounded wire 33 through connector 36. A.C. wires 32 are terminated in a standard 3-prong plug 38, and reside in standard insulating covers, such as 37.

Figure 6:
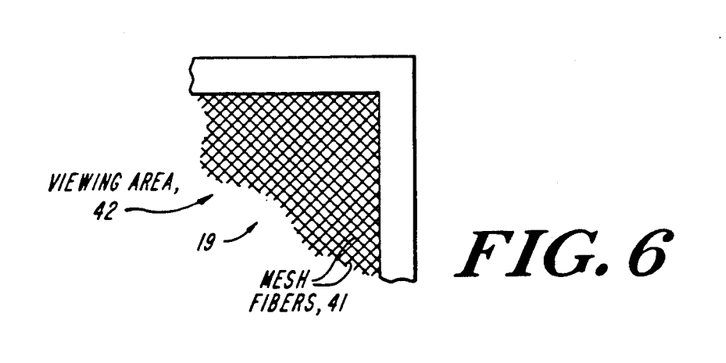
FIG. 6 is a detail of the shielding conductive mesh according to the invention.

FIG. 6 shows a detail view of transparent shielding mesh 19. Fibers 41 of mesh are oriented at a 45 degree angle to the orthogonal boundaries of the rectangular viewing area 42.

Figure 7:
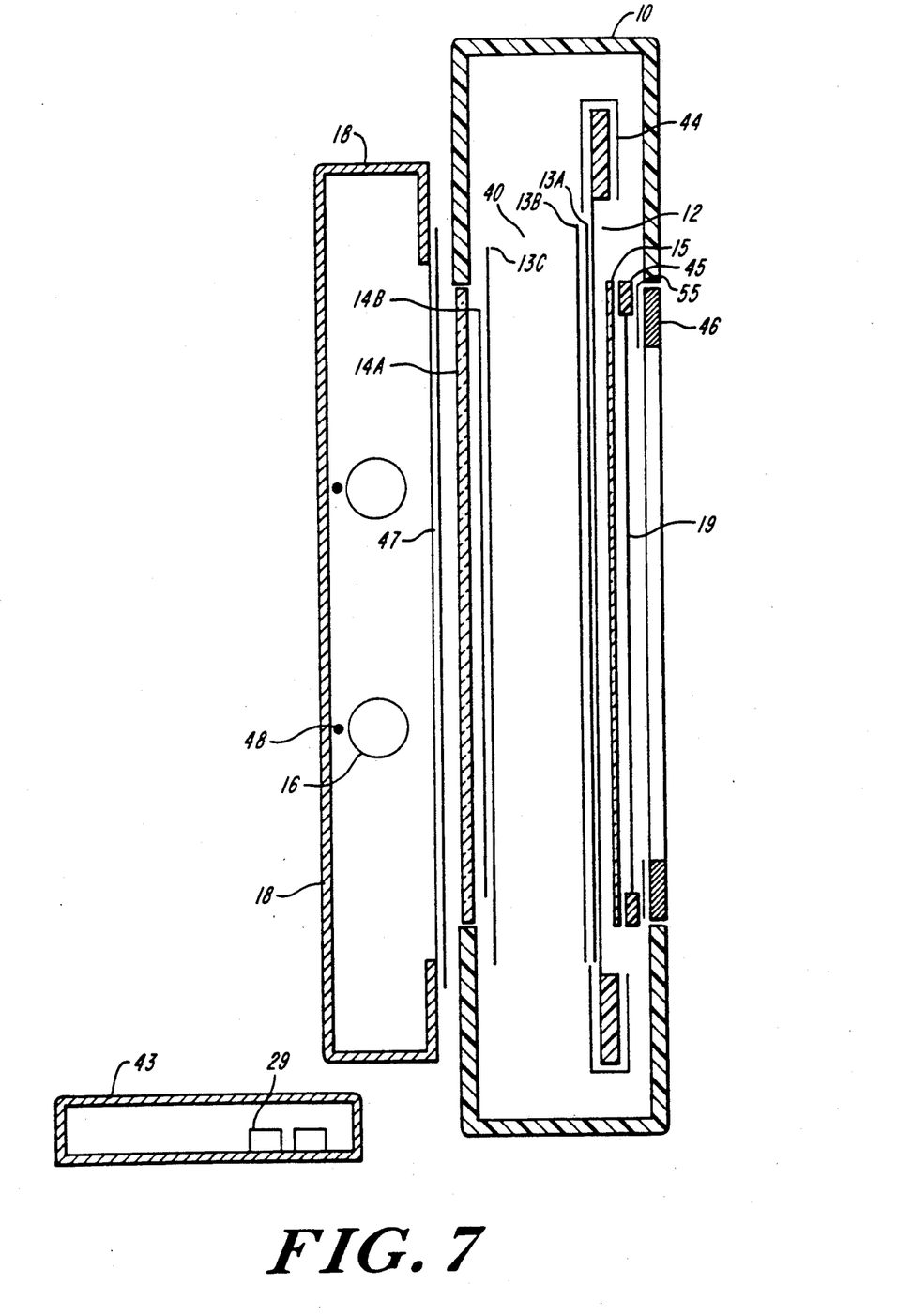
FIGS. 7 and 8 are assembled and exploded views of an alternative embodiment of the invention.
Figure 8:
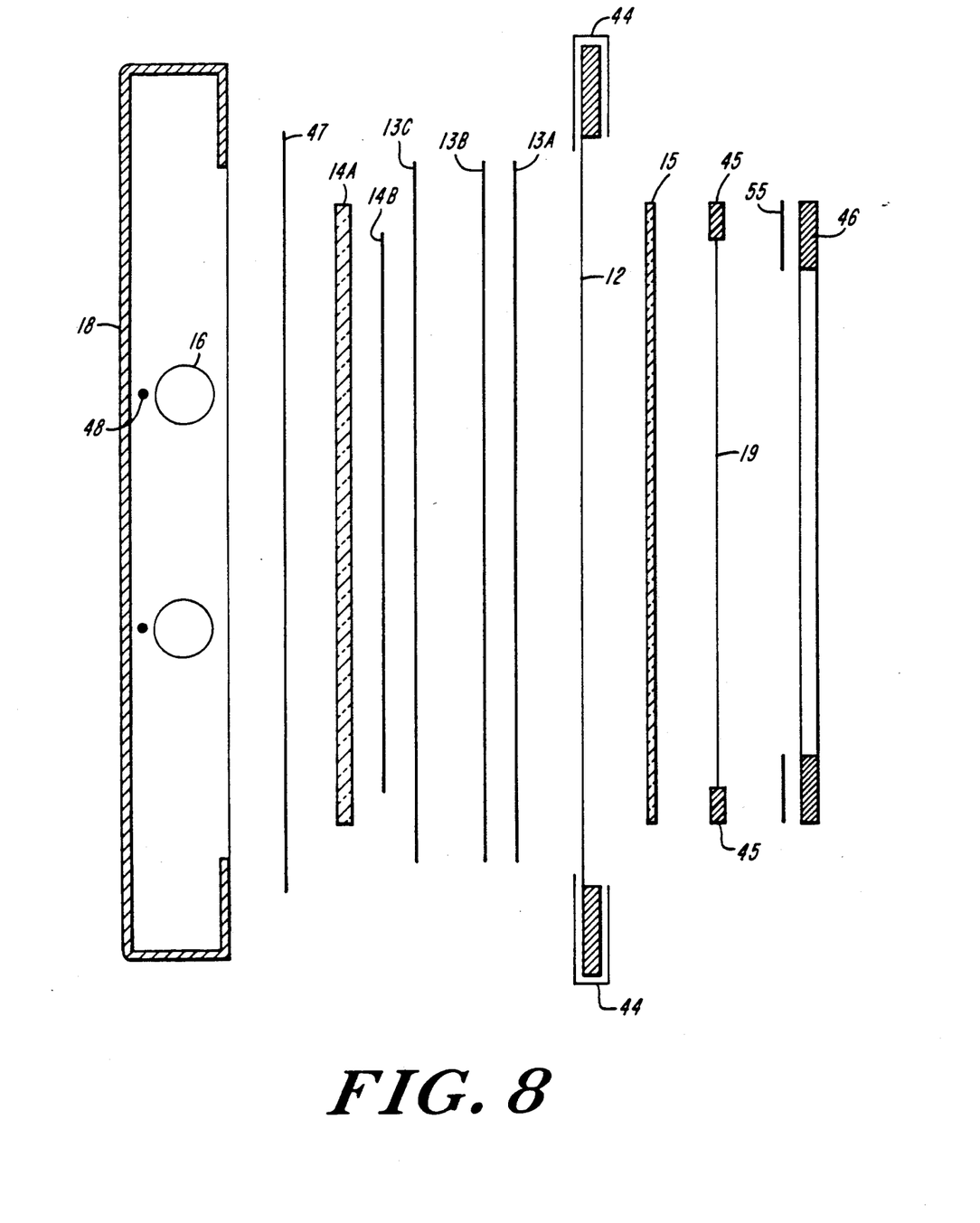

FIG. 7 is a side view of an alternative embodiment, and FIG. 8 is an exploded view of FIG. 7 more clearly illustrating assembly details.

Fluorescent lights 16 are enclosed in a conductive, grounded enclosure 18. This enclosure is magnetically shielded (i.e., it is manufactured of a "$\mu$-material" such as ferrite, soft iron, or nickel alloy). The front of the enclosure 18 is covered by a grounded, conductive metal screen 47 (e.g., a panel of standard window screen material) having openings with a diameter of a few millimeters. Wires 48 carrying electrical power to fluorescent lights 16 are also shown. The location and connection of these wires will be described in more detail in conjunction with FIG. 10.

The light dimmer color panel is in front of metal screen 47, and comprises a transparent or translucent panel 14A backing a filtering film 14B. The rear diffuser 13C comprises one or more sheets of opalized paper or plastic.

The circuit boards at the perimeter of LCD 12 are surrounded by a grounded metal enclosure 44 which inhibits electric field radiation. Grounded metal enclosure 44 comprises, for example, a conducting foil or conductive paint supported by an insulating plastic housing.

In this embodiment, rather than being laminated onto a display glass 11 as in FIG. 2, transparent shield 19 is supported by a plastic frame 45. An O-shaped, grounded, metallic shield 55, comprising a piece of tinfoil or other conductive metal, is laminated to the rear of an O-shaped plastic cover 45. Metallic shield 55 is not visible from the front of the device because plastic cover 45 is opaque.

This embodiment is preferred because, although the transparent shield 19 is exposed (i.e., it is not covered by a display glass 11 as in FIG. 2) and therefore is less protected, if transparent shield 19 is a fiber mesh (e.g., a standard anti-glare screen cover deposited with conductive material) the glare from the display is substantially reduced.

In addition to the shielding discussed above, main housing 10 is lined with a grounded, conductive material, such as tinfoil or a conductive paint to further inhibit the radiation of electric fields that may escape the other shielding.

The ballasts 29 which power fluorescent lights 16 are located in a power strip 43 external to the main housing 10 and light box assembly 18. The ballasts are located near to each other in opposite configurations such that their radiated magnetic fields cancel. The housing of power strip 43 is grounded and is manufactured of a conductive $\mu$metal or magnetically shielded material such as ferrite, soft iron, or nickel alloy.

Figure 9:
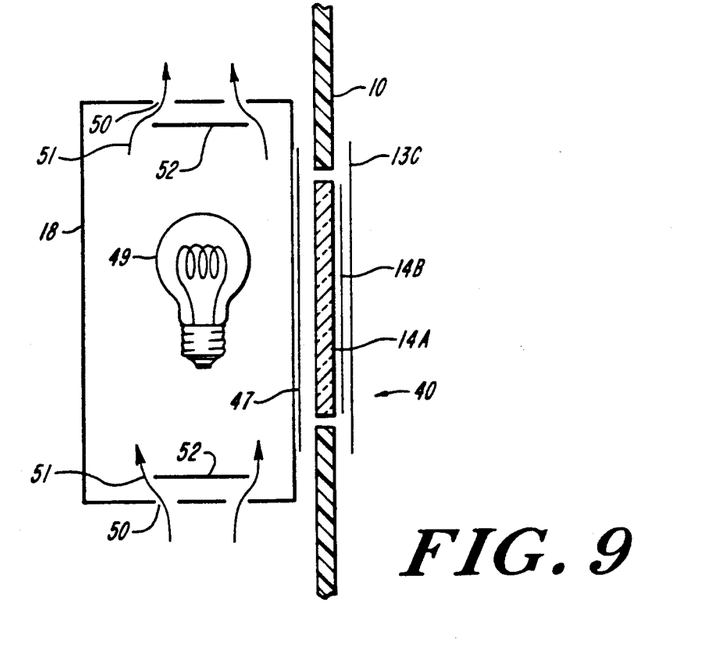
FIG. 9 shows the use of an incandescent bulb in an alternative embodiment of the invention.

Referring to FIG. 9, in an alternative embodiment, an incandescent bulb 49 is used as a light source in place of fluorescent lights 16. The heat generated by bulb 49 is vented from light box assembly 18 via air vents 50 (air convection follows flow arrows 51). Light blocking panels 52 prevent light from exiting from the top and bottom of the light box assembly 18, for cosmetic purposes. Enclosure 18 is covered by metal screen 47, and is affixed to main housing 10 as in FIG. 7. The transparent panel 14A (which backs filtering film 14B), and the cavity 40 between rear diffuser 13C and light background/diffusers 13A and 13B (not shown) provide insulation that obstructs heat flow from incandescent bulb 49 to LCD 12.

Figure 10:
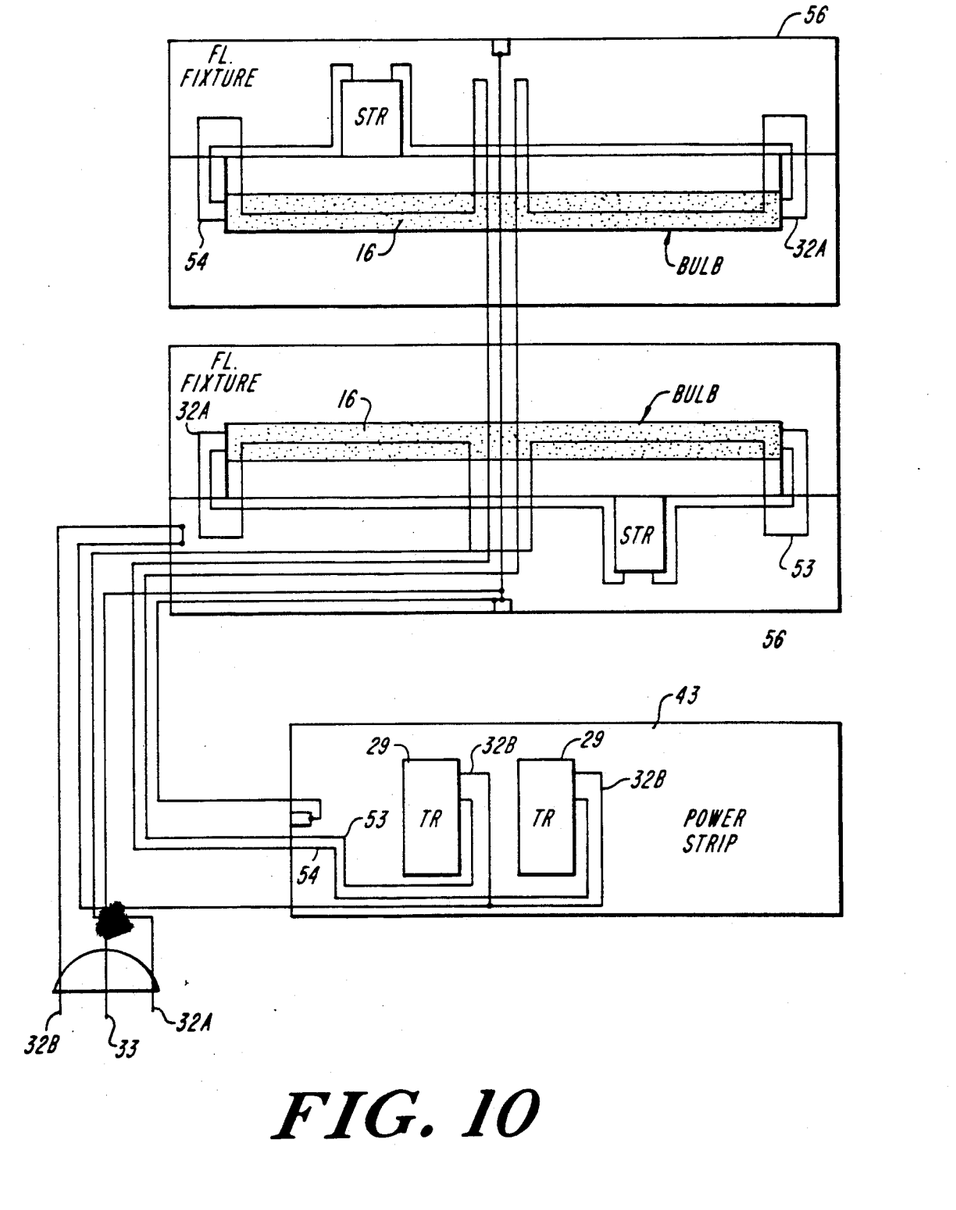
FIG. 10 is a wiring diagram.

Referring to FIG. 10, the wiring of the invention is arranged to cancel electric and magnetic fields. Each wire is carefully paired with a complementing wire carrying oppositely-directed current.

Fluorescent lights 16 are wired so that their fields are opposed. AC power lead 32A is connected directly to the ends of fluorescent lights 16. AC power lead 32B (after looping to and from fixtures 53 to cancel fields) connects through ballasts 29 producing outputs 53, 54 which are connected to the other ends of fluorescent lights 16. These connections are made so that current flows oppositely through the two bulbs, cancelling fields.

Each wire that leads to the ends of a fluorescent light is closely affixed to the light's surface (see, e.g., wires 48, FIG. 8) so as to minimize the area of the current loop formed by the wire 48 and the current path through the light.

Ground lead 33 is connected to the conductive shields discussed above, to the fixtures 56 for fluorescent lights 16, and to the conductive, magnetically shielded power strip casing 43.

The invention comprises a flat panel (e.g., an LCD) video display which may be connected to a microcomputer, minicomputer, mainframe computer or other source of video signals. The video display allows for display of text or graphics by electronically converting a video input, such as a Red/Green/Blue (RGB) or other style input to a video signal for display on the flat panel. The invention significantly reduces electric, magnetic, and high-energy fields radiated by conventional video display. LCD's do not use high-voltage/high-current circuits and avoid significant magnetic and high energy radiation. The low level of electric field radiation normally emitted by an LCD is reduced through suitable shielding.

A preferred embodiment of the invention embodies an Eiki DD-1000 digital display monitor, available from Eiki International, Laguna Miguel, Calif., that accepts an RGB signal and displays the video information on the LCD, or a Sharp QA-50 panel display, available from Sharp Electronics Corporation, Sharp Plaza, Mahwah, N.J. 07430, which accepts a VGA signal and displays the video information on the LCD.

The invention includes additional features for conditioning the light to improve visibility and reduce eye strain. Referring to FIG. 1, Diffusers 13A and 13C help to evenly illuminate LCD 12 and improve contrast. The user can select the background color and the amount of light transmitted through LCD 12 by inserting dimmer/color panels 14 between light source 16 and LCD 12. The panels 14 may be colored plastic sheets, or may be polarized. If panels 14 are polarized, the interaction of the polarized backlight and LCD 12 can create a dimming effect. In one embodiment of the invention this dimming effect can be controlled by varying the orientation of panels 14. In another embodiment, the panels may be replaced by a rotating polarized wheel, so that rotating the wheel produces a similar dimming effect.

Panels 14 interact with polarized filter 15 to alter the color of the screen to suit the desires of the user. For example, a yellow panel 14 used with a grey polarized film 15 results in a display having a blue foreground and a green background. In another example, with no panel 14 and a grey polarized film 15, the display has a yellowish tinge. With no panel 14 or film 15, the display has a black foreground and a white background, but has reduced contrast.

The invention accepts standard video signal input. In one embodiment, the invention accepts a RGB signal input which maps the screen into 320 by 200 dots, each dot mapped to one of 16 colors and one of two intensity levels. The preferred LCD assembly processes the RGB signal and adapts it to the screen density of 640 by 200, which improves the resolution and clarity of the output. The invention can connect to computers with IBM PC color graphics adapters (CGA), and can also connect to PC's with other graphics adapters operated in a CGA mode. The input interface is provided by interface electronics. Referring to FIG. 2, RGB converter 22 is within the Eiki DD-1000 digital display. It supports reverse images. Converter 22 also controls parameters such as phase, frequency, horizontal and vertical position, so as to accommodate any RGB input.

Other embodiments using a Sharp QA-50 accept a VGA signal with 640×480 dots, which allows greater graphics flexibility. These embodiments also provide different LCD intensities to represent different colors.

Referring to FIG. 7, the use of magnetically shielding material in light box assembly 18 and power strip 43 reduces the magnetic fields that are radiated by the invention. Furthermore, separating the magnetic ballasts 29 from the main enclosure (and thus from the user) provides further protection from magnetic fields.

Furthermore, the use of grounded, conductive enclosures such as the enclosure 44 that encloses LCD 12, the power strip 43 that encloses ballasts 29, or the assembly housing 18 and metal screen 47 that enclose fluorescent lights 16, reduces the electric field radiation produced by various sources.

In particular, the shielding of the fluorescent lights includes a metallic screen that allows light to be transmitted to the LCD 12 without allowing the passage of low-frequency electric field radiation (e.g., the 60 Hz radiation produced by the power line). Because the screen is not solid metal, frequencies having wavelengths comparable to the size of the openings in the screen may pass through the screen. However, for a 1 cm opening size, these frequencies are well above 1 GHz; thus the screen impedes the majority of electric field radiation.

Other embodiments are within the claims.

What is claimed is:

1. A video display comprising,
   a flat panel display,
   and shielding apparatus,
   said shielding apparatus shielding electric field radiation emitted by said flat panel display and including a transparent conducting surface overlying said display,
   wherein said flat panel display is a liquid crystal display.

2. The video display as claimed in claim 1,
   wherein said shielding apparatus is a grounded conducting surface comprising a metallic transparent mesh.

3. A video display as claimed in claim 2 wherein said flat panel display has a rectangular viewing surface with orthogonal sides and said mesh is formed of thin intersecting conductors nonparallel to said sides.

4. A video display comprising,
   a flat panel display,
   shielding apparatus,
   said shielding apparatus shielding electric field radiation emitted by said flat panel display and including a transparent conducting surface overlying said display,
   wherein said shielding apparatus is a grounded conducting surface comprising a metallic transparent mesh,
   and light apparatus for illuminating said display,
   said lighting apparatus enclosed in a conductive housing.

5. The video display terminal as claimed in claim 4,
   where said lighting apparatus comprises a miniature fluorescent bulb powered by a magnetic device and connected to a power source by a power cord,
   said power cord shielded by a conductive, grounded sheath.

6. The video display as claimed in claim 4 and further comprising
   a polarizing filter placed between said lighting apparatus and said flat panel display such that the interaction of said lighting apparatus and said display create a dimming effect.

7. The video display as claimed in claim 6, wherein said filter is adjustable to produce a desired level of dimming.

8. The video display as claimed in claim 4 and further comprising,
a parabolic light redirection surface arranged to focus and redistribute the light illuminating said flat panel display.

9. The video display as claimed in claim 4 and further comprising,
a light balancer comprised of opaque sheets for distributing light evenly on said flat panel display.

10. The video display as claimed in claim 4 and further comprising,
at least one colored member placed between said lighting apparatus and said flat panel display for controlling the character of the illuminating light.

11. The video display as claimed in claim 4, where said lighting apparatus comprises an incandescent bulb connected to a power source by a power cord, and
said conductive housing is vented to permit the passage of air.

12. The video display as claimed in claim 11, further comprising a translucent panel between said lighting apparatus and said flat panel display whereby heat from said incandescent bulb is insulated from said flat panel display.

13. The video display as claimed in claim 4, where said conductive housing comprises a metallic screen.

14. The video display as claimed in claim 4, where said conductive housing is manufactured of a magnetically shielding material.

15. The video display as claimed in claim 4, where said lighting apparatus comprises two miniature fluorescent bulbs powered by two magnetic devices, and
said magnetic devices are oriented relative to each other to cancel their field radiation.

16. The video display as claimed in claim 18, where said magnetic devices are located in a power strip which may be placed at a distance from said flat panel display, and
said power strip is manufactured of a magnetically shielding material.

17. A video display as claimed in claim 4, where said lighting apparatus comprises a miniature fluorescent bulb, and
further comprising wires for carrying electric power to said lighting apparatus, where said wires are closely affixed to said bulb's surface.

18. A video display comprising,
a flat panel display,
said shielding apparatus,
said shielding apparatus shielding electric field radiation emitted by said flat panel display and including a transparent conducting surface overlying said display,
wherein said flat panel display includes a converter for converting video input signals into a video signal for controlling said display.

19. A video display comprising,
a flat panel display,
and shielding apparatus,
said shielding apparatus shielding electric field radiation emitted by said flat panel display and including a transparent conducting surface overlying said display,
wherein said shielding apparatus is a grounded conducting surface comprising a metallic transparent mesh,
wherein said flat panel display has a rectangular viewing surface with orthogonal sides and said mesh is formed of thin intersecting conductors nonparallel to said sides,
wherein said thin intersecting conductors form an angle of substantially 45° with said sides.

20. A video display comprising,
a flat panel display,
shielding apparatus,
lighting apparatus for illuminating said display,
said lighting apparatus enclosed in a conductive housing comprising said shielding apparatus,
said lighting apparatus comprising a miniature fluorescent bulb powered by a magnetic device and connected to a power source by a power cord,
said power cord shield by a conductive grounded sheath comprising said shielding apparatus.

21. The video display as claimed in claim 20, wherein said conductive housing is of a magnetically shielding material.

* * * * *